US012665154B2

(12) United States Patent
Park et al.

(10) Patent No.: US 12,665,154 B2
(45) Date of Patent: Jun. 23, 2026

(54) ELECTRON GUN USING VIRTUAL SOURCE METHOD

(71) Applicant: KOREA RESEARCH INSTITUTE OF STANDARDS AND SCIENCE, Daejeon (KR)

(72) Inventors: In Yong Park, Daejeon (KR); Takashi Ogawa, Daejeon (KR); Ha Rim Lee, Seoul (KR); Junhyeok Hwang, Icheon-si (KR)

(73) Assignee: Korea Research Institute of Standards and Science, Daejeon (KR)

( * ) Notice: Subject to any disclaimer, the term of this patent is extended or adjusted under 35 U.S.C. 154(b) by 0 days.

(21) Appl. No.: 18/884,943

(22) Filed: Sep. 13, 2024

(65) Prior Publication Data

US 2025/0095944 A1 Mar. 20, 2025

(30) Foreign Application Priority Data

Sep. 15, 2023 (KR) ........................ 10-2023-0123258

(51) Int. Cl.
*H01J 1/148* (2006.01)
*H01J 1/46* (2006.01)

(52) U.S. Cl.
CPC ................ *H01J 1/148* (2013.01); *H01J 1/46* (2013.01)

(58) Field of Classification Search
CPC ................................................ H01J 1/13–316
See application file for complete search history.

(56) References Cited

U.S. PATENT DOCUMENTS

| | | | | |
|---|---|---|---|---|
| 2010/0320942 A1* | 12/2010 | Hayn | .................... | H01J 37/063 315/379 |
| 2020/0090897 A1* | 3/2020 | Kasuya | ................. | H01J 37/075 |
| 2023/0178325 A1* | 6/2023 | Fukuta | .................... | H01J 37/07 250/492.3 |

FOREIGN PATENT DOCUMENTS

| | | | | |
|---|---|---|---|---|
| GB | 2389450 A * | 12/2003 | .............. | H01J 1/148 |
| JP | 2000021288 A * | 1/2000 | | |
| KR | 10-1909670 B1 | 10/2018 | | |
| KR | 10-2022-0145384 A | 10/2022 | | |
| KR | 10-2023-0004450 A | 1/2023 | | |

OTHER PUBLICATIONS

Office Action dated Jan. 17, 2024 in Korean Patent Application No. 10-2023-0123258 in 6 pages.

* cited by examiner

*Primary Examiner* — Mariceli Santiago
(74) *Attorney, Agent, or Firm* — Knobbe, Martens, Olson & Bear, LLP

(57) ABSTRACT

Provided is an electron gun using a virtual source method that may have a high angular current density, a narrow energy distribution, and stable electron emission characteristics by forming a virtual source inside a thermal electron source ($LaB_6$, $CeB_6$)-based emitter emitting an electron beam.

4 Claims, 8 Drawing Sheets

ELECTRON GUN USING VIRTUAL SOURCE METHOD

CROSS-REFERENCE TO RELATED APPLICATIONS

This application claims priority under 35 U.S.C. § 119 to Korean Patent Application No. 10-2023-0123258, filed on Sep. 15, 2023, in the Korean Intellectual Property Office, the disclosure of which is incorporated herein by reference in its entirety.

TECHNICAL FIELD

The following disclosure relates to an electron gun using a virtual source method, and more particularly, to an electron gun using a virtual source method that may have a high angular current density, a narrow energy distribution, and stable electron emission characteristics by forming a virtual source in the electron gun based on a thermal electron source ($LaB_6$, $CeB_6$).

BACKGROUND

Electron guns that generate an electron beam have been utilized in various basic science and industrial fields, such as electron microscopes, particle accelerators, electron beam lithography, and electron beam machining. Tungsten filament (W hairpin) type, $LaB_6$, $CeB_6$ thermionic emission type, zirconium oxide/tungsten (ZrO/W) Schottky emitter's extended Schottky electron emission type, and tungsten tip (W tip) field emission type electron guns have been mainly commercialized and used.

Among these, the thermionic emission type electron gun, which operates in high vacuum ($<10^{-5}$ Pa) and is easy to operate, has been used in many electron microscopes and X-ray generators but is difficult to apply to high-resolution electron microscopes because a physical size of a source is large (<50 μm) and an energy distribution (>1 eV) is wide.

In addition, the extended Schottky electron emission type electron gun has been used in high-resolution electron microscopes because it enables stable electron emission and the physical size of a source is small (<500 nm) to have excellent resolution, but the electron gun should operate in ultra-high vacuum ($<10^{-7}$ Pa).

In addition, the tungsten tip (W tip) field emission type electron gun is suitable for high-resolution electron microscopes due to a very small physical size of a source (<10 nm) and a narrow energy distribution (<0.3 eV), but it should operate in ultra-high vacuum ($<10^{-7}$ Pa) and has unstable electron emission characteristics, compared to the extended Schottky emission type.

Also, the thermal electron source electron gun, such as tungsten filament and $LaB_6$, $CeB_6$ operate in a way that a crossover point is formed by a Wehnelt electrode disposed in front of a thermal electron source, but since a size of the source (the size of the crossover point) is formed to be less than tens of micrometers, it is difficult to achieve high-resolution imaging, and since an energy distribution is formed to be wide due to an interaction between electrons caused by the formation of a crossover point, chromatic aberration increases in an electromagnetic lens, making high-resolution imaging difficult.

The disclosure of this section is to provide background information relating to the present disclosure. Applicant does not admit that any information contained in this section constitutes prior art.

SUMMARY

An embodiment of the present disclosure is directed to providing an electron gun using a virtual source method that may have a high angular current density, a narrow energy distribution, and stable electron emission characteristics by forming a virtual source inside a thermal electron source ($LaB_6$, $CeB_6$)-based emitter emitting an electron beam to the outside.

In one general aspect, an electron gun using a virtual source method includes: an emitter emitting an electron beam to the outside; a suppressor electrode disposed at a position surrounding the emitter based on a direction of emission of the electron beam; and an extraction electrode disposed on one side of the suppressor electrode, wherein the emitter has a virtual source formed therein and emits the electron beam to the outside.

The emitter may be formed of lanthanum hexaboride ($LaB_6$) or cerium hexaboride ($CeB_6$).

A diameter of a tip of the emitter may be less than or equal to a preset first predetermined value.

Sizes of holes of the suppressor electrode and the extraction electrode may be less than or equal to a preset second predetermined value.

A distance between the suppressor electrode and the extraction electrode may be within a preset first predetermined range.

At least one of the suppressor electrode and extraction electrode may be formed of at least one material among stainless steel (SUS), aluminum, molybdenum, titanium, and tantalum, etc.

The suppressor electrode may be disposed behind a tip of the emitter based on the emission direction of the electron beam.

Other features and aspects will be apparent from the following detailed description, the drawings, and the claims.

DETAILED DESCRIPTION OF EMBODIMENTS

Figure 1:
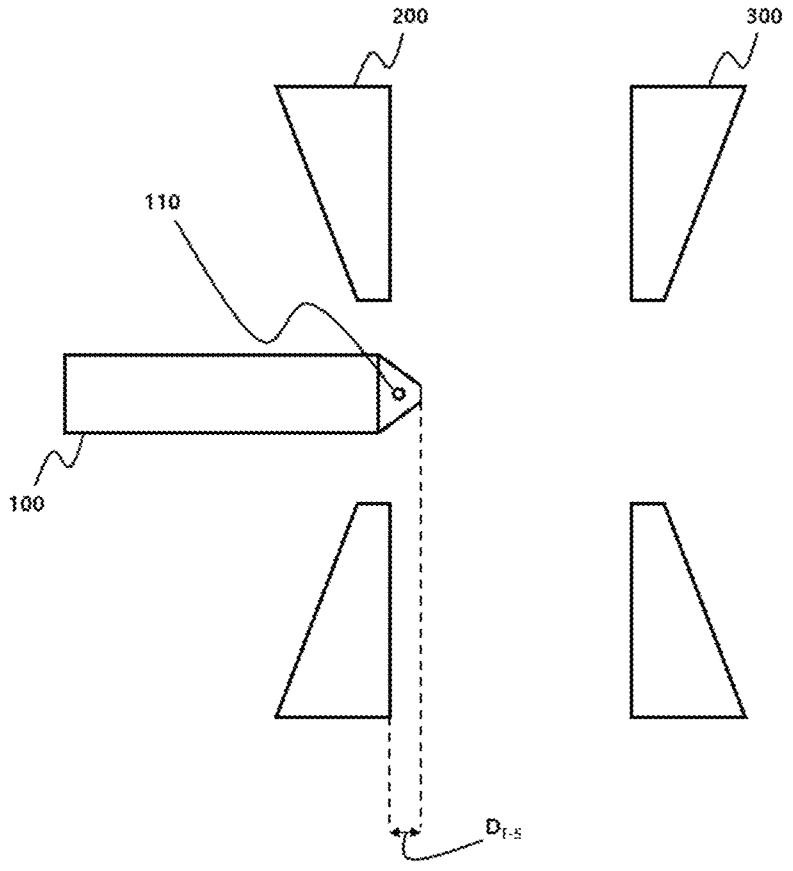
FIG. 1 is a side cross-sectional view of an electron gun using a virtual source method according to an embodiment of the present disclosure.

The aspects, features, and advantages of the disclosure will become apparent from the following description of the embodiments with reference to the accompanying drawings, which are set forth hereinafter. The specific structures and functional description will be only provided for the purpose of illustration of the embodiments according to the concept of the disclosure, so that the embodiments of the disclosure may be embodied in many different forms and should not be construed as being limited to the embodiments set forth herein. The embodiments according to the concept of the disclosure may be changed to diverse forms, so that the disclosure will be described and illustrated with reference to specific embodiments. However, it should be understood that the embodiments according to the concept of the disclosure are not intended to limit the disclosure to the specific embodiments disclosed, but they include all the modifications, equivalences, and substitutions, which are included in the scope and spirit of the disclosure. It will be understood that although the terms "first," "second," etc. may be used herein to describe various devices, these devices should not be limited by these terms. These terms are only used to distinguish one device from another device. Thus, a first device discussed below could be termed a second device and vice versa without departing from the nature of the disclosure. It will be understood that when a device is referred to as being "connected or coupled" to another device, it may be directly connected or coupled to the other device or intervening devices may be present therebetween. In contrast, when a device is referred to as being "directly connected" or "directly coupled" to another device, there are no intervening devices present. Other expressions, such as "between," "directly between," "adjacent," or "directly adjacent" should be understood in a similar manner. The terminology used herein is for the purpose of describing particular embodiments only and is not intended to limit the disclosure. As used herein, the singular forms "a," "an" and "the" are intended to include the plural forms as well, unless the context clearly indicates otherwise. It will be further understood that the terms "comprises" and/or "comprising," or "includes" and/or "including," when used in this specification, specify the presence of stated features, integers, steps, operations, devices and/or components, but do not preclude the presence or addition of one or more other features, integers, steps, operations, devices, components and/or groups thereof. Unless otherwise defined, the meaning of all terms including technical and scientific terms used herein are the same as those commonly understood by one of ordinary skill in the art to which the disclosure pertains. It will be further understood that terms, such as those defined in commonly used dictionaries, should be interpreted as having a meaning which is consistent with their meaning in the context of the relevant art and the disclosure, and will not be interpreted in an idealized or overly formal sense unless expressly so defined herein. Hereinafter, embodiments will be described in detail with reference to the accompanying drawings. The same reference numerals indicated in the drawings refer to similar devices throughout.

FIG. 1 is a side cross-sectional view of an electron gun using a virtual source method according to an embodiment of the present disclosure. The electron gun using a virtual source method according to an embodiment of the present disclosure is described in detail with reference to FIG. 1.

As shown in FIG. 1, the electron gun using a virtual source method according to an embodiment of the present disclosure may include an emitter 100, a suppressor electrode 200, and an extraction electrode 300.

Referring to each component in detail, the emitter 100 may emit an electron beam into a vacuum.

In detail, the emitter 100 emits the electron beam into a vacuum as a surface of a tip protruding in a direction of emission of the electron beam is heated by an external power source.

At this time, a diameter of the tip of the emitter 100 may be equal to or less than a preset first predetermined value.

Here, the preset first predetermined value is 50 μm, but is not necessarily limited thereto. However, as a result of conducting various experiments using the electron gun using a virtual source method according to an embodiment of the present disclosure, it was confirmed that, when the diameter of the tip of the emitter 100 is 50 μm or less, the electron gun has a high angular current density, a narrow energy distribution, and stable electron emission characteristics, and thus, the present disclosure is limited thereto.

In addition, the emitter 100 may be formed of lanthanum hexaboride ($LaB_6$) or cerium hexaboride ($CeB_6$).

In addition, the emitter 100 may have a virtual source 110 formed therein and may emit the electron beam to the outside, which will be described in detail below.

The suppressor electrode 200 may be disposed at a position surrounding the emitter 100 based on the emission direction of the electron beam.

In detail, the suppressor electrode 200 may be disposed behind the tip of the emitter 100 based on the emission direction of the electron beam.

In the related art electron gun, the Wehnelt electrode is disposed in front of an electron source based on the emission direction of the electron beam, but in the electron gun according to the present disclosure, the suppressor electrode 200 is disposed behind the tip of the emitter 100 based on the emission direction of the electron beam. As a result, electrons emitted into a vacuum around the tip of the emitter 100 are suppressed, and electrons are induced to be emitted into the vacuum only from one end of the tip of the emitter 100, and the virtual source 110 is formed inside the tip of the emitter 100.

The extraction electrode 300 may be disposed in front of the suppressor electrode 200 along the axis.

Specifically, an extractor voltage is applied to the extraction electrode 300 and one end of the tip of the emitter 100 to form an electric field that induces field emission so that electrons may be emitted from one end of the tip. Due to this, an electron emission trace is formed from the virtual source 110 formed inside the emitter 100.

In other words, due to the material of lanthanum hexaboride ($LaB_6$) or cerium hexaboride ($CeB_6$) of the emitter 100, as the extractor voltage is applied to one end of the tip of the emitter 100, thermal field electron emission is induced.

At this time, sizes of holes of the suppressor electrode 200 and the extraction electrode 300 may be equal to or less than a preset second predetermined value.

In addition, a distance between the suppressor electrode 200 and the extraction electrode 300 may be equal to or less than a preset first predetermined range.

Here, the preset second predetermined value is 5 mm in diameter, and the preset first predetermined range is equal to or greater than 0.5 mm and equal to or less than 2 mm, but is not necessarily limited thereto. However, as a result of conducting various experiments using the electron gun using a virtual source method according to an embodiment of the present disclosure, it was confirmed that, when the sizes of the holes of the suppressor electrode 200 and the extraction electrode 300 are 5 mm or less in diameter and when the distance between the suppressor electrode 200 and the extraction electrode 300 is 0.5 mm or more and 2 mm or less, a high angular current density, a narrow energy distribution, and stable electron emission characteristics are achieved, and thus the present disclosure is limited thereto.

In addition, at least one of the suppressor electrode 200 and the extraction electrode 300 may be formed of at least one material among stainless steel (SUS), aluminum, molybdenum, titanium, and tantalum, etc.

Hereinafter, simulation and experimental results of the electron gun using a virtual source method according to an embodiment of the present disclosure will be described with reference to FIGS. 2 to 8. Here, FIG. 2 shows simulation results for the electron gun using a virtual source method according to an embodiment of the present disclosure, and FIGS. 3 to 8 show actual experimental results for an electron gun using a virtual source method according to an embodiment of the present disclosure.

Figure 2:
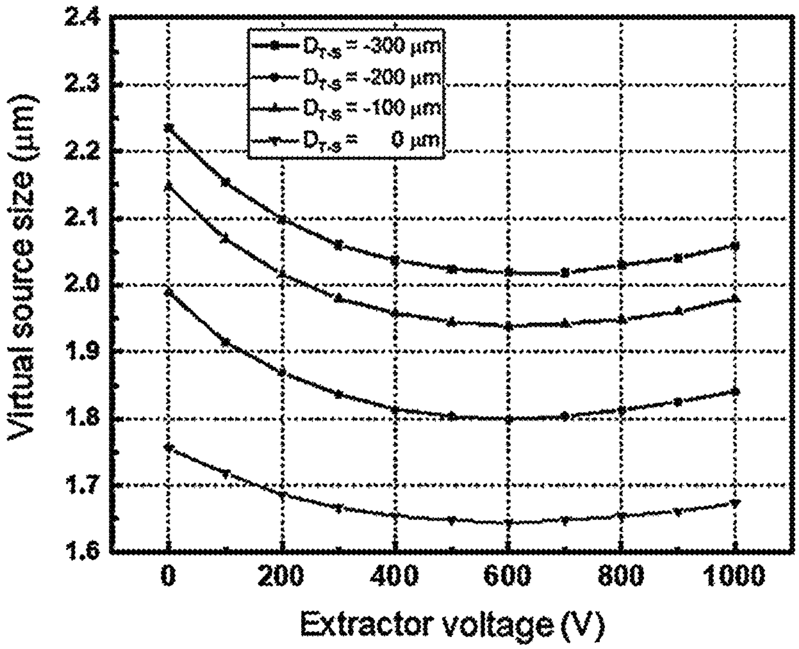
FIG. 2 is a graph showing a size of a virtual source according to a distance between an emitter tip and a suppressor electrode of an electron gun using a virtual source method according to an embodiment of the present disclosure.

FIG. 2 is a graph showing a size of a virtual source according to a distance between an emitter tip and a suppressor electrode of an electron gun using a virtual source method according to an embodiment of the present disclosure.

In the simulation results of FIG. 2, the horizontal axis represents an extractor voltage between the extraction electrode 300 and the emitter 100, and the vertical axis represents the size of the virtual source 110 formed inside the emitter 100. In addition, $D_{T\text{-}S}$ represents a distance between the tip of the emitter 100 and the suppressor electrode 200, as shown in FIG. 1. Referring to FIG. 2, it can be seen that the virtual source 110 of the electron gun using a virtual source method according to an embodiment of the present disclosure may be reduced to a size of at least 1.64 μm depending on the position of the suppressor electrode 200.

Figure 3:
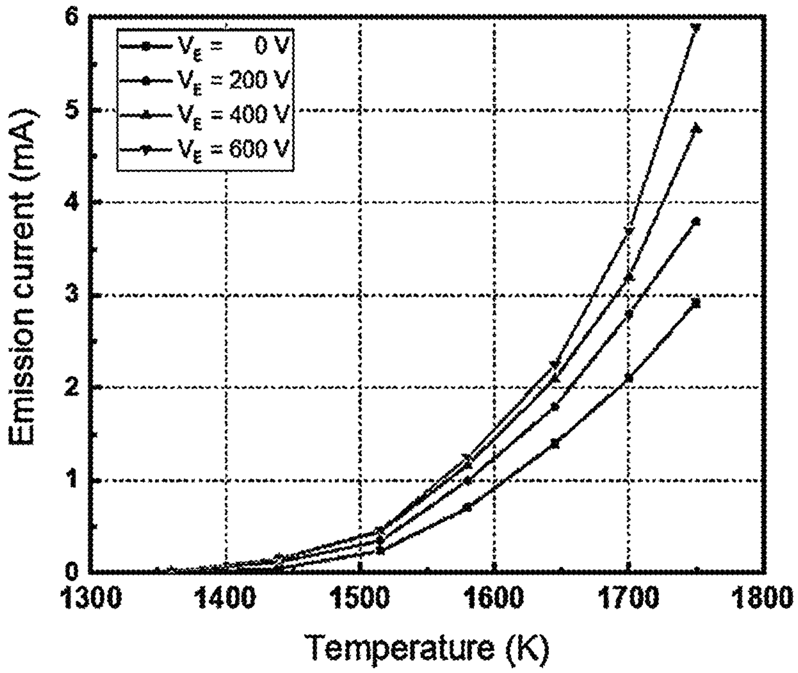
FIG. 3 is a graph showing an emission current according to a tip heating temperature and an extractor voltage of an electron gun using a virtual source method according to an embodiment of the present disclosure.
Figure 4:
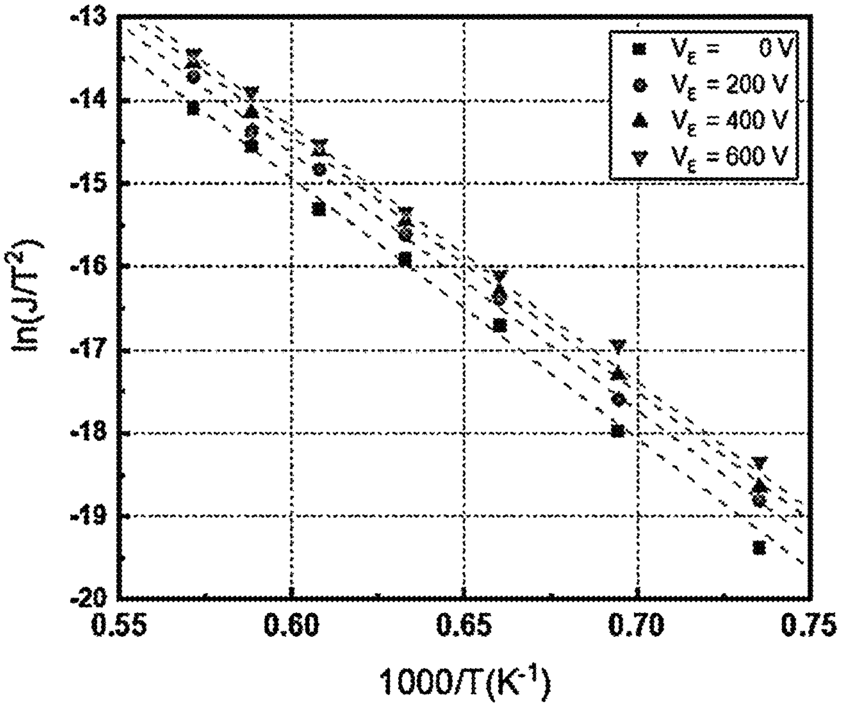
FIG. 4 is a graph showing a Richardson plot according to an extractor voltage of an electron gun using a virtual source method according to an embodiment of the present disclosure.

FIG. 3 is a graph showing an emission current according to a tip heating temperature and an extractor voltage of an electron gun using a virtual source method according to an embodiment of the present disclosure, and FIG. 4 is a graph showing a Richardson plot according to an extractor voltage of an electron gun using a virtual source method according to an embodiment of the present disclosure.

In the experimental results of FIG. 3, the horizontal axis represents a tip heating temperature of the emitter 100, and the vertical axis represents an emission current.

Referring to FIG. 3, it can be seen that the emission current of the electron gun using a virtual source method according to an embodiment of the present disclosure increases as an extractor voltage increases. In addition, referring to FIG. 4, since the slope of each straight line on the graph is proportional to a work function of a material, it can be seen that the work function of the material decreases as the extractor voltage increases, and thus the electron emission characteristics are improved.

Figure 5:
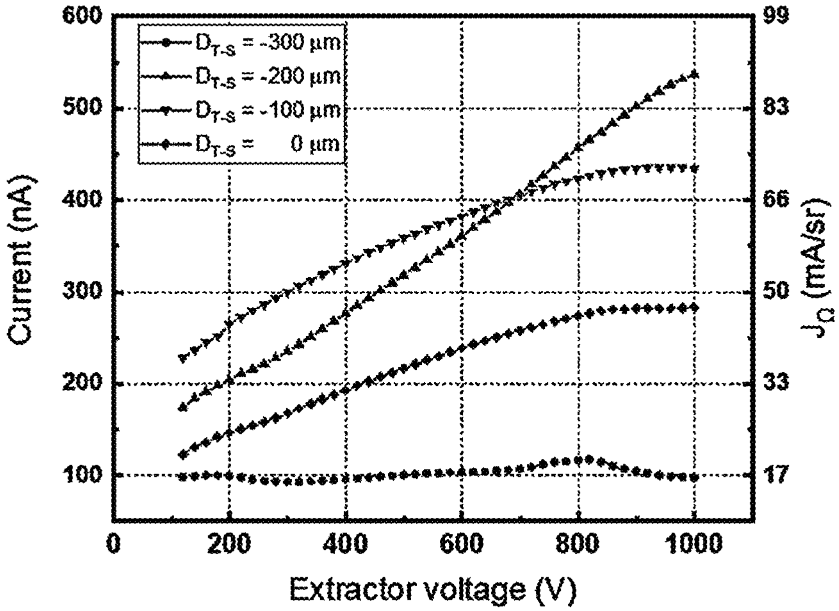
FIG. 5 is a graph showing an angular current density according to a distance between a tip and a suppressor electrode and an extractor voltage of an electron gun using a virtual source method according to an embodiment of the present disclosure.

FIG. 5 is a graph showing an angular current density according to a distance between a tip and a suppressor electrode and an extractor voltage of an electron gun using a virtual source method according to an embodiment of the present disclosure.

In the experimental results of FIG. 5, the horizontal axis represents an extractor voltage between the extraction electrode 300 and the emitter 100, and the vertical axis on the right represents an angular current density. Referring to FIG. 5, it can be seen that, the angular current density of the electron gun using a virtual source method according to an embodiment of the present disclosure is 91 mA/sr when $D_{T\text{-}S}$=−200 μm, which is an improved angular current density.

Figure 6:
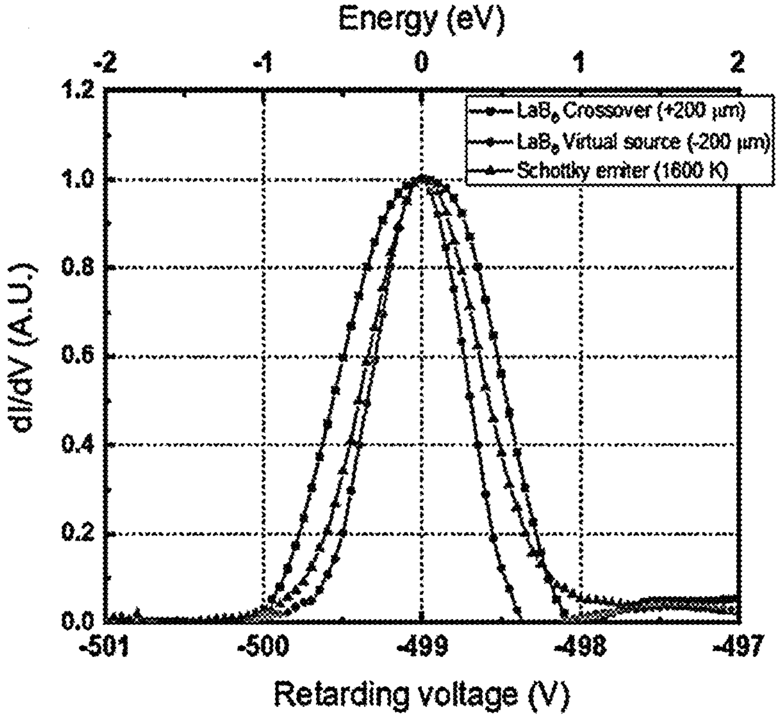
FIG. 6 is a graph showing energy distributions of an electron gun using a virtual source method according to an embodiment of the present disclosure, a related art electron gun having a crossover point, and a zirconium oxide/tungsten (ZrO/W) Schottky electron gun at the same tip heating temperature.

FIG. 6 is a graph showing energy distributions of an electron gun using a virtual source method according to an embodiment of the present disclosure, a related art electron gun having a crossover point, and a zirconium oxide/tungsten (ZrO/W) Schottky electron gun at the same tip heating temperature.

In the experimental results of FIG. 6, the upper horizontal axis represents measured energy (eV). Referring to FIG. 6, the related art electron gun having a crossover point has a wide energy distribution of 0.99 eV due to the repulsion between electrons at the crossover point, the zirconium oxide/tungsten (ZrO/W) Schottky electron gun operates at a lower temperature than a recommended tip heating temperature but has an energy distribution of 0.86 eV, and the electron gun using a virtual source method according to an embodiment of the present disclosure has a narrow energy distribution of 0.55 eV compared to the two electron guns.

Figure 7:
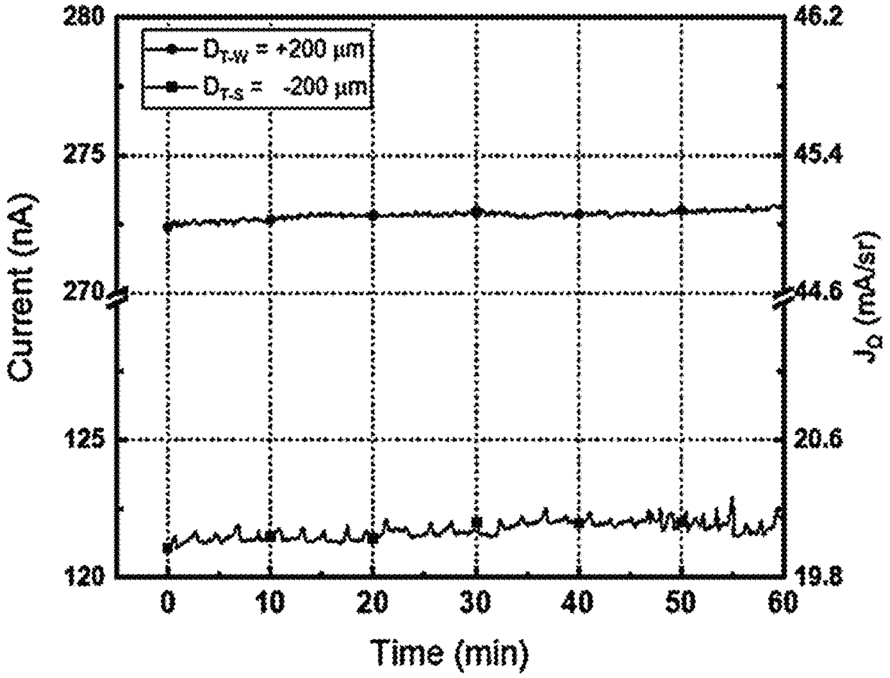
FIG. 7 is a graph showing a current stability of an electron gun using a virtual source method according to an embodiment of the present disclosure and the related art electron gun having a crossover point.
Figure 8:
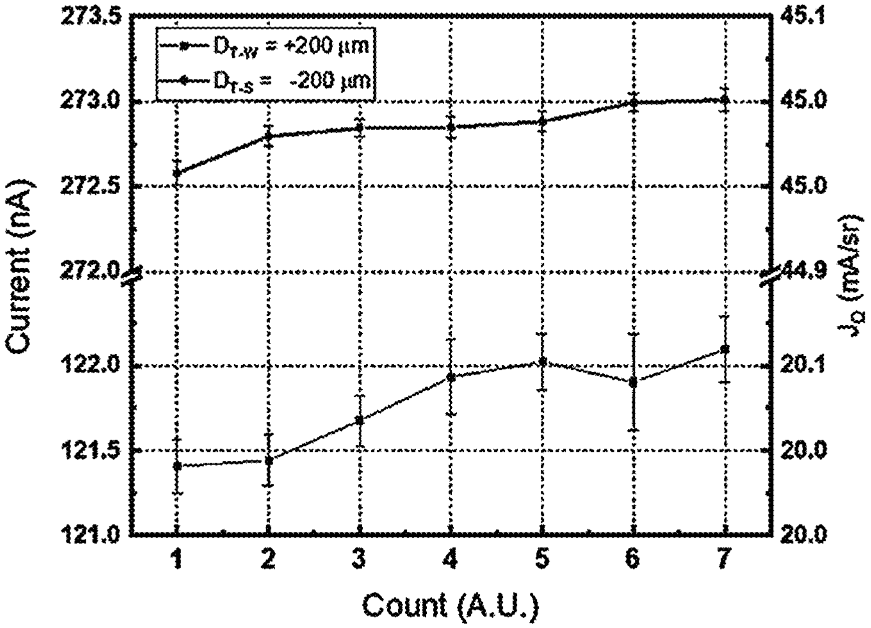
FIG. 8 is a graph showing a short-term current stability of an electron gun using a virtual source method according to an embodiment of the present disclosure and the related art electron gun having a crossover point.

FIG. 7 is a graph showing a current stability of each of an electron gun using a virtual source method according to an embodiment of the present disclosure and the related art electron gun having a crossover point, and FIG. 8 is a graph showing a short-term current stability of an electron gun using a virtual source method according to an embodiment of the present disclosure and the related art electron gun having a crossover point.

In the experimental results of FIGS. 7 and 8, the right vertical axis represents an angular current density, the left vertical axis represents a measured current, and $D_{T\text{-}W}$ represents a distance between the tip of the emitter 100 of the related art electron gun in which a crossover point is formed and the suppressor electrode 200. Referring to FIG. 6, the amplitude of each graph represents a current stability, and in the related art electron gun in which a crossover point is formed, the current stability is ±0.28%/hr, and in the electron gun using a virtual source method according to an embodiment of the present disclosure, the current stability is ±0.05%/hr. In addition, referring to FIG. 7, the amplitude of each graph represents a short-term current stability for 10 minutes, and in the related art electron gun in which a crossover point is formed, the current stability is ±0.138%, and in the electron gun using a virtual source method according to an embodiment of the present disclosure, the current stability is ±0.022%. Therefore, it can be seen that the electron gun according to the present disclosure operates more stably, compared to the related art electron gun.

Therefore, referring to the simulation and experimental results of FIGS. 2 to 8, the electron gun using a virtual source method according to an embodiment of the present disclosure has the advantages of having a high angular current density, a narrow energy distribution, and stable electron emission characteristics, compared to the related art electron gun in which a crossover point is formed.

According to the electron gun using a virtual source method according to various embodiments of the present disclosure as described above, the angular current density, energy distribution, and electron beam stability may be improved, and thus, high-resolution imaging, high signal-to-noise ratio, fast data processing speed, and high analysis performance may be obtained due to the improved performance of the electron beam.

In addition, the energy distribution of the electron beam may be minimized and an improved angular current density may be obtained.

In addition, since the reliability of the electron gun is improved in the long term, maintenance costs may be reduced and the life of the device may be extended.

In addition, the electron gun may be able to operate in a low-vacuum environment and at a tip heating temperature lower than 1800 K.

In addition, the reliability of the electron gun may be improved in the long term, and since the life of the device may be extended, maintenance costs may be reduced.

Although embodiments of the present disclosure have been described above, the embodiments disclosed in the present disclosure are not intended to limit the technical spirit of the present disclosure, but are only for explanation. Therefore, the technical spirit of the present disclosure includes not only each disclosed embodiment, but also a combination of the disclosed embodiments, and furthermore, the scope of the technical spirit of the present disclosure is not limited by these embodiments. In addition, those skilled in the art to which the present disclosure pertains may make many changes and modifications to the present disclosure without departing from the spirit and scope of the appended claims, and all such appropriate changes and modifications, as equivalents, are to be regarded as falling within the scope of the present disclosure.

DETAILED DESCRIPTION OF MAIN ELEMENTS

100 emitter
110 virtual source
200 suppressor electrode
300 extraction electrode

What is claimed is:

1. An electron gun using a virtual source method, the electron gun comprising:

an emitter configured to emit an electron beam to the outside;

a suppressor electrode disposed at a position behind a tip of the emitter based on a direction of emission of the electron beam and surrounding the emitter; and an extraction electrode disposed on one side of the suppressor electrode, wherein the emitter has a virtual source formed inside an interior region of the emitter, wherein the suppressor electrode is configured to suppress electron emission from regions other than the tip and to induce formation of the virtual source inside the emitter, wherein sizes of holes of the suppressor electrode and the extraction electrode are less than or equal to 5 mm in diameter, wherein a distance between the suppressor electrode and the extraction electrode is greater than or equal to 0.5 mm and less than or equal to 2 mm, and wherein the suppressor electrode comprises a first surface and a second surface inclined relative to the first surface to define a tapered tip of the suppressor electrode, the tapered tip of the suppressor electrode having a first thickness defined by a distance between the first surface and the second surface in the direction of emission and gradually decreasing toward a distal end of the suppressor electrode; and wherein the extraction electrode comprises a third surface opposing the first surface and a fourth surface inclined relative to the third surface to define a tapered tip of the extraction electrode, the tapered tip of the extraction electrode having a second thickness defined by a distance between the third surface and the fourth surface in the direction of emission and gradually decreasing toward a distal end of the extraction electrode.

2. The electron gun of claim 1, wherein the emitter is formed of lanthanum hexaboride (LaB6) or cerium hexaboride (CeB6).

3. The electron gun of claim 1, wherein a diameter of a tip of the emitter is less than or equal to 50 μm.

4. The electron gun of claim 1, wherein at least one of the suppressor electrode and extraction electrode is formed of at least one material among stainless steel (SUS), aluminum, molybdenum, titanium, and tantalum.

* * * * *